United States Patent [19]

Breveglieri et al.

[11] Patent Number: 4,923,202

[45] Date of Patent: * May 8, 1990

[54] UTILITY CART

[75] Inventors: Frank Breveglieri, Spring Lake, Mich.; Kenneth F. Streit, Mt. Prospect, Ill.

[73] Assignee: Geerpres, Inc., Muskegon, Mich.

[*] Notice: The portion of the term of this patent subsequent to May 10, 2005 has been disclaimed.

[21] Appl. No.: 15,950

[22] Filed: Feb. 18, 1987

Related U.S. Application Data

[63] Continuation-in-part of Ser. No. 912,567, Sep. 26, 1986, Pat. No. 4,743,040.

[51] Int. Cl.$^5$ .................................................. B62B 3/00
[52] U.S. Cl. .................................... 280/47.35; 403/167; 211/190; 108/107
[58] Field of Search .................. 280/79.3, 47.34, 47.35, 280/79.1 R, 79.1 A, 79.2, 47.26, 47.28; 108/111, 144, 107, 110, 148; 211/189, 187, 190; 285/321; 403/70, 167, 196, 235, 230, 397, 398, 364, 360, 261; 248/244, 245

[56] References Cited

U.S. PATENT DOCUMENTS

| D. 115,352 | 6/1939 | Scudder | D34/18 |
|---|---|---|---|
| 2,311,422 | 2/1943 | Walling | 280/50 |
| 2,424,644 | 7/1947 | Barrett | 280/50 |
| 2,596,749 | 5/1952 | Webber | 211/1 |
| 2,833,550 | 5/1958 | Frick | 280/47.34 |
| 3,102,648 | 9/1963 | Hughes | 214/375 |
| 3,682,323 | 8/1972 | Bergquist | 108/110 |
| 3,874,531 | 4/1975 | Mayo | 214/130 R |
| 4,119,044 | 10/1978 | Hines | 108/27 |
| 4,281,843 | 8/1981 | Johnson et al. | 280/47.26 |
| 4,350,366 | 9/1982 | Helms | 208/655 |
| 4,355,818 | 10/1982 | Watts | 280/654 |
| 4,596,405 | 6/1988 | Jones | 280/823 |

Primary Examiner—Charles A. Marmor
Assistant Examiner—Richard Camby
Attorney, Agent, or Firm—Harness, Dickey & Pierce

[57] ABSTRACT

The present invention is a manually propelled utility cart having a base, an intermediate slideable tray, and a top tray. The base includes wheels for movement of the utility cart along the floor surface. Vertical structural support members are provided for supporting the intermediate tray and the top tray vertically upward from the base. The intermediate tray has an adjustable positioning assembly and is in releasably slideable engagement with the vertical support members. The top tray includes molded utensil clips and has a handle with an integral trash bag retention portion. The upper tray also has upper support member engaging portions. The vertical structural support members includes at least one hollow rod structural member which is engaged and secured in compression between upper and lower support post engagement portions. The adjustable positioning assembly includes releasable clamping systems for releasably clamping the intermediate tray in variable vertical positions between the base and the top tray. In an alternate embodiment, an adjustable positioning assembly is also provided which includes a bore and counterbore which define a shoulder arrangement in the intermediate tray. The support members are provided with a plurality of peripheral grooves along the vertical length. A expandable ring is provided to be releasably placed in the grooves. The counterbore engages the ring to hold it in position in the groove while the shoulder rests on the ring to support the tray at a predetermined position.

21 Claims, 3 Drawing Sheets

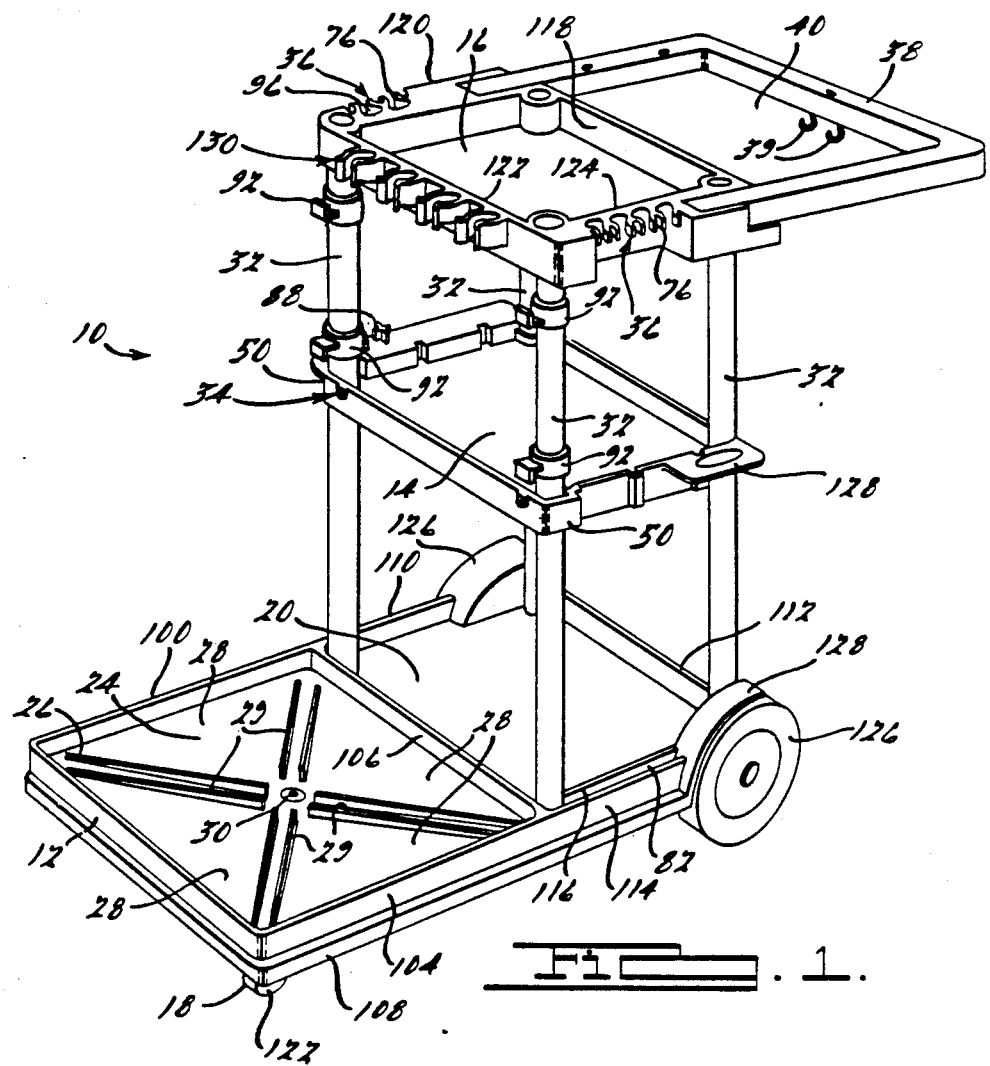

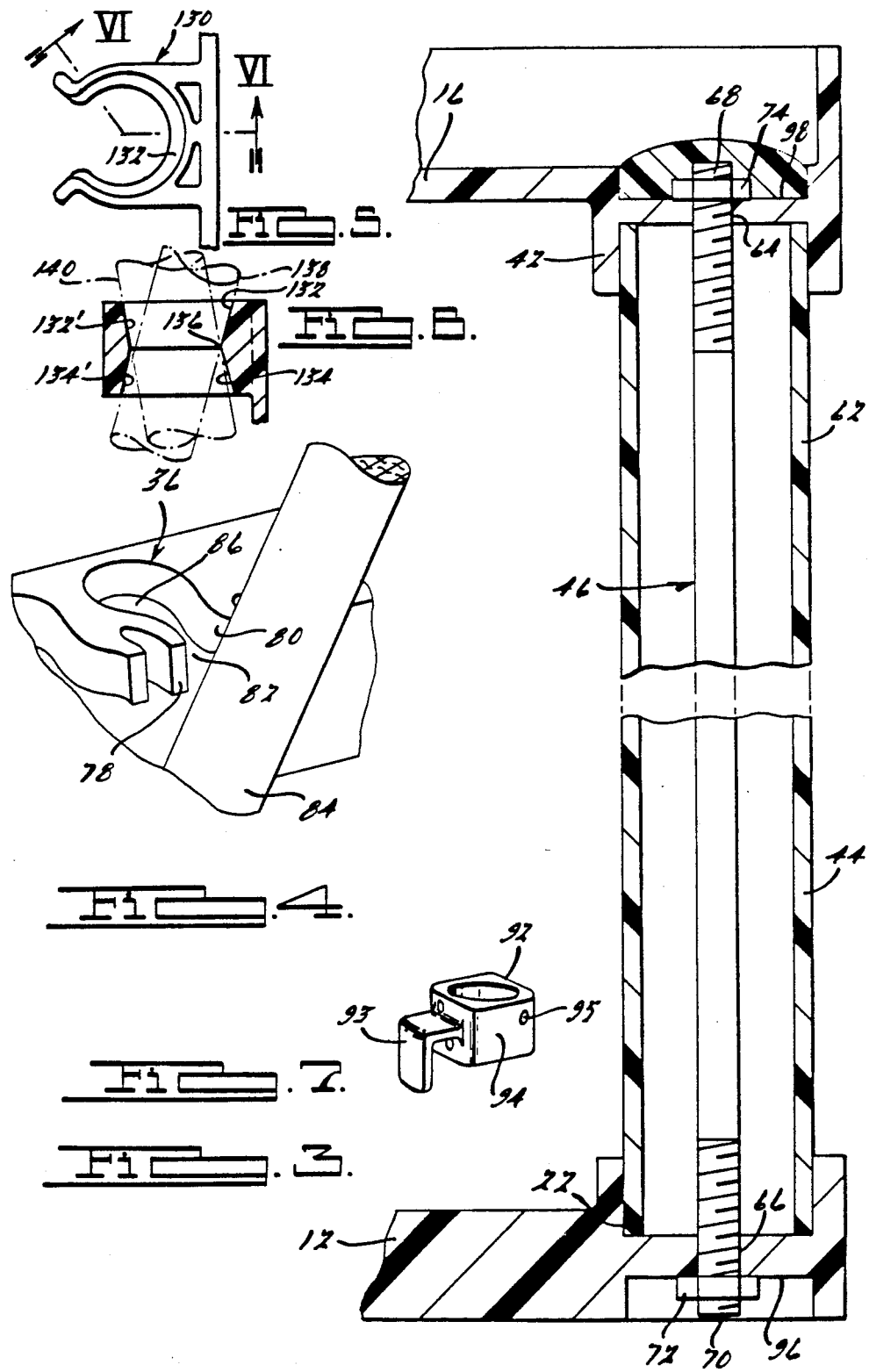

UTILITY CART

REFERENCE TO RELATED APPLICATION

This application is a continuation in part of co-pending application Ser. No. 912,567 filed Sept. 29, 1986, which is now U.S. Pat. No. 4,743,040, issued 5/10/88.

TECHNICAL FIELD

The subject invention relates to a movable cart for the transport of cleaning utensils. More specifically, the present invention is a wheeled utility cart for use by a cleaning person wherein the cleaning person can efficiently carry all the necessary implements for normal cleaning duties.

BACKGROUND ART

It has been the goal of prior art devices to produce a utility cart which efficiently and conveniently will hold in a readily accessible position all implements or tools required in a janitorial or cleaning person's job. However, because of the varying natures in the janitorial or cleaning job environment, the cart must be flexible enough to be readily adapted to a particular job environment. In addition, the utility cart must be of durable construction which is impervious to harsh and caustic chemicals generally used in cleaning operations.

Prior art devices have generally met the durability requirement for a utility cart by constructing the apparatus out of heavy duty steel tubular members. The tubular members are generally welded or clamped together. Some examples of these prior art devices include H. J. Barnett, U.S. Pat. No. 2,424,644; Webber, U.S. Pat. No. 2,596,749; Walling, U.S. Pat. No. 2,311,422; and Scudder, U.S. Pat. No. D-115,352; and Mayo, U.S. Pat. No. 3,874,531. The increased weight, because of the use of steel in these utility carts, requires a heavy duty axle and wheel assembly, substantially increasing the cost of the unit, or may even require a motorized vehicle to transport the cart as taught by Mayo, U.S. Pat. No. 3,874,531. In addition, the use of these heavy materials creates unnecessary fatigue on the cleaning personnel who are the ultimate users of these carts due to the extra effort required to push the heavy utility cart around. A further disadvantage of the use of steel construction is that it readily yields to the corrosive properties of cleaning materials which will inevitably get spilled or otherwise come into contact with the parts of the utility carts. In addition, steel is not waterproof and easily corrodes when exposed to the elements increasing the necessary maintenance such as painting and other types of protection of the cart.

In addition, the prior art devices either do not efficiently use cart space, or in the alternative do not provide sufficient cart space for all of the required cleaning utensils. These devices also are inflexible and cannot be customized to the particular needs of a final user.

STATEMENT OF THE INVENTION

According to the present invention, there is provided a manually propelled utility cart comprising a base means, a top tray means, and an intermediate tray means. The base means includes a wheeled movement means for multidirectional horizontal movement of the utility cart along a floor surface. The base means also includes a utility tray means, a lower support post engaging means, and a mop bucket carrying means.

A vertical structural support means is provided for supporting the intermediate tray means and the top tray means in a vertically upward position from the base means. The intermediate tray means has adjustable positioning means and is also in slideable engagement with the vertical structural support means. The top tray means has an upper support post engaging means. The vertical structural support means includes at least one hollow rod structural member which is engaged and secured in compression between lower support post engagement means and the upper support post engaging means by a compression means. The adjustable positioning means includes releasable clamping means for releasably clamping the intermediate tray means in variable vertical positions between the utility tray means and the top tray means.

In an alternate embodiment the adjustable positioning means includes a throughbore means and a counterbore means defining a shoulder portion. Peripheral grooves are provided in the structural member. An expandable ring means is provided for positioning in the groove. The throughbore means is slideable over the structural support member. The counterbore means is slideable over the expandable ring means for holding the ring in the groove. The shoulder portion rests on the expandable ring means for preventing movement of the intermediate tray means beyond a predetermined position.

It is an object of the present invention to construct a utility cart which solves the problems of the prior art devices.

More particularly, it is an object of the present invention to provide a utility cart of a simplified lightweight and durable construction which is impervious to caustic chemicals and fluids used by cleaning personnel.

It is a further object of the present invention to provide a utility cart which uses structural components of readily available materials, is inexpensive and easy to construct and provides for easy customization and replacement of structural components.

It is a further object of the present invention to provide a utility cart with all major components being interchangeable by the final user, thus allowing for replacement of only a part of the utility cart when only a part is damaged or broken.

It is a further object of the invention to provide a secure means for carrying a mop bucket with or without casters, on the utility cart itself, thus eliminating the cumbersome task of the carrying or pulling of the castered mop bucket, by the cleaning person.

It is a furthr object of the present invention to provide a utensil handle clamping member which will securely engage a handle of a mop or other utensil which may be situated at a variety of angles.

It is a further object of the present invention to provide a simplified adjustment assembly for adjusting the tray height in a utility cart.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational perspective view of the utility cart of the present invention;

FIG. 2 is a cross sectional top view of the adjustable clamping assembly of the present invention;

FIG. 3 is a cross sectional plan view partially broken away showing the compressed tubular construction of the present invention; and FIG. 4 is a detailed perspective view of the molded clip assembly of the present invention.

FIG. 5 is a top view of the modified mop handle engaging clip of the present invention.

FIG. 6 is a cross sectional view of the modified mop handle engaging clip of FIG. 5 taken along line 6—6.

FIG. 7 is a perspective view of the adjustable hook means of the present invention.

DETAILED DESCRIPTION OF THE DRAWINGS

Figure 8:
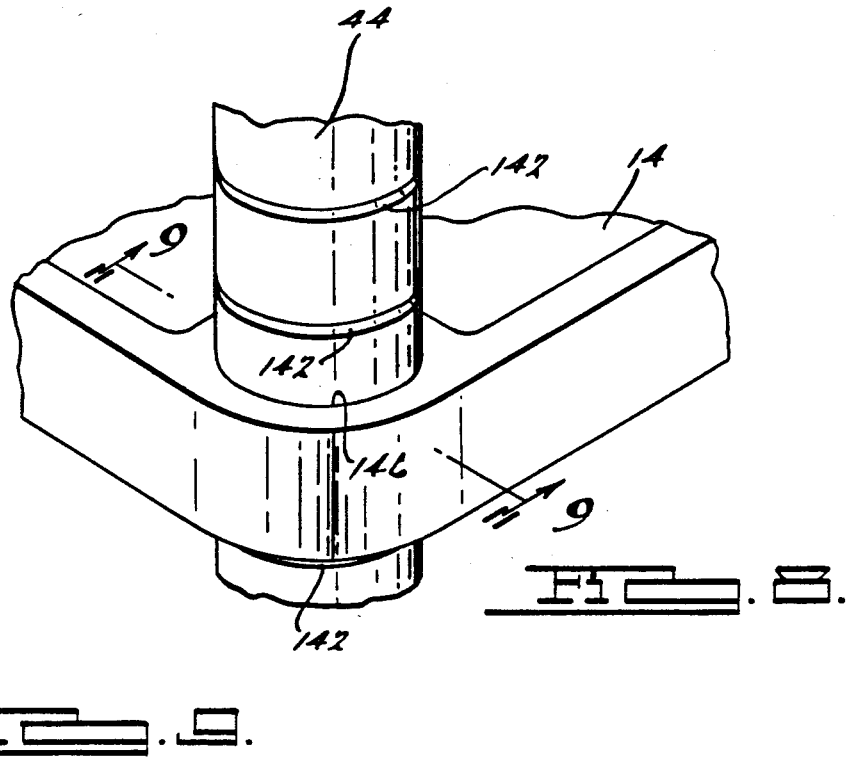
FIG. 8 is a perspective view of the adjustable positioning assembly of an alternate embodiment of the present invention.

A manually propelled utility cart of the present invnetion is generally shown at 10 in FIG. 1. As shown in FIG. 1, the utility cart 10 comprises a base means 12, an intermediate tray means 14, and a top tray means 16. The base means 12 includes wheeled movement means 18 which allows the utility cart to move in multiple horizontal directions along the floor surface. The base means 12 includes a utility tray means 20, lower support post engaging means 22, and mop bucket carrying means 24. The mop bucket carrying means 24 includes means 26 for restraining movement of a castered mop bucket and levely and securely carrying a mop bucket. The mop bucket carrying means 24 also includes a draining surface 28 and a drain and drain plug means 30. The draining surface means 28 along with the drain and drain plug means 30 allows the final user to selectively retain or drain any spillage from the mop bucket while the mop bucket is transported on the mop bucket carrying means 24.

The mop bucket carrying means 24 of a preferred embodiment of the present invention defines a level surface which has the dual function of either securely holding a normal mop bucket at level or will engage and restrain the movement of the casters of a castered mop bucket.

In a preferred embodiment of the present invention, the mop bucket carrying means 24 is box-like portion having the draining surface 28 as the floor of the box-like portion. The draining surface tapers downward toward the drain and drain plug means 30. The drain surface includes four triangular shaped draining portions angled downward which form an inverse pyramidal shaped surface. The mop bucket carrying means includes four pairs of rib members 26. Each pair of rib members extends diagonally inward from the corners of the box-like portion with the inner end of each rib member tapering into a wider girth such that the top surface 29 of the rib members 26 would be on the same plane. The top surface 29 provides a level supporting surface for a mop bucket.

Vertical structural support means 32 are provided in the present invention for supporting the intermediate tray means 14 and the top tray means 16 in a vertically upward position from the base means 12. The intermediate tray means 14 has adjustable positioning means generally shown at 34. The intermediate tray means 14 is also in slideable engagment with the vertical structural support means 32.

The top tray means 16 includes molded utensil holding means generally shown at 36. The top tray means 16 also includes handle means 38 which has integral trash bag retention means 40 integrally attached thereto. The upper tray means 16 also has upper support post engaging means 42 which are best shown in FIG. 3. The vertical structural support means 32 includes at least tubular structural member 44 which is engaged and secured in compression between the lower support post engagement means 22 and the upper support post engagement means 42. The compression is accomplished by way of compression means generally shown at 46 in FIG. 3.

In one embodiment of the invention the adjustable positioning means includes a releasable clamping means 48 for releasably clamping the intermediate tray means 14 in variable vertical positions between the utility tray means 20 and the top tray means 16.

The slideable engagement of the intermediate tray means 14 is accomplished by a through hole in the intermediate tray means 14 at the corners 50 of the intermediate tray means 14. The through hole has an arcuate vertical surface 52 which operates to engage the outside of the diameter of the tubular structural member 44. The clamping means includes an arcuate strap 56 which has a pair of companion bolted flanges 58. The pair of companion bolted flanges 58 are operatively attached to the arcuate vertical surface 52 and operate to securely clamp the tubular structural member 44 between the arcuate vertical surface 52 and arcuate strap 56.

Figure 9:
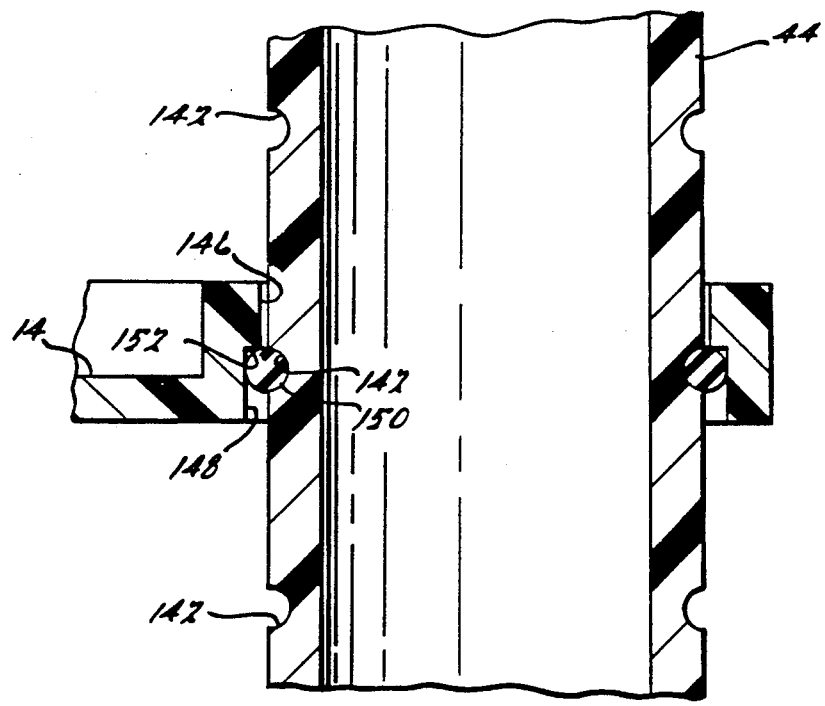
FIG. 9 is a detailed sectional view taken along line 9—9 of FIG. 8 showing the adjustable positioning assembly of the present invention.

An alternate embodiment of the adjustable positioning means includes the adjustable positioning assembly as shown in FIGS. 8 and 9. As shown in FIGS. 8 and 9 the structural member 44 includes a series of peripheral grooves 142 along the vertical length of the structural member 44 the intermediate tray 14 or other movable member is provided with a throughbore means 144 which engages the outer periphery of the structural member 44 in a close sliding fit. A counterbore means 148 is provided and is in alignment with throughbore 144 to define a shoulder portion 152. Expandable ring means 150 is provided for releasable engagement into a groove 142 such that a portion of the ring means extends outward from the groove 142. the counterbore means 148 is designed to securely engage the ring means 150 around its periphery such that the ring means 150 cannot be displaced out of the groove 142 by the downward pressure from shoulder portion 152 on the ring means 150.

In operation the ring means 150 is placed in a selected groove 142 with the tray or other movable member positioned on the structural member 44 above the position of the ring means 150. The tray or movable member is then moved downward with the counterbore means securely engaging the outer part of ring 150 protruding from the groove 142 until shoulder portion 152 engages the top of the ring means 150. The tray or other movable member is securely held in the desired position and from further downward movement by the engagement of shoulder 152 with ring means 150.

In the preferred embodiment of the invention the structural member 44 is cylindrical in cross-section. However, other cross-sectional shapes could be used for structural member. For instance, an octagonal, triangular or square shape could be used to advantageously prevent rotation of a movable member around the structural member 44.

Preferably, groove 142 has a semi-circular cross-section and extends circumferentially around the structural member 44. The elastomeric ring means 150 is an 'O' ring type member made out of a resilient elastomer material and preferably has a circular cross-section. The 'O' ring has parts which extend outward from groove 142 when it is positioned in the groove 142. The cross-sectional diameter of the 'O' ring 150 is preferably about twice the radius of the semi-circular cross-section of groove 142.

The 'O' ring 150 must be expandable such that the ring 150 can be removed from the groove 142. The 'O' ring must also be resilient such that the ring will engage in another of the grooves 142 as necessary.

A plurality of grooves is provided on the structural member 44 to allow the final user a wide range of adjustments for the tray 14 or other movable member. In the preferred embodiment of the invention four of the structural members 44 with a plurality of grooves 142 are provided. The intermediate tray 14 has the bore means 146 and counterbore means 148 which define the shoulder portions 152 at each corner thereof. In this configuration the intermediate tray 14 is held securely in position at each of its four corners and can be repositioned simply by lifting the tray 14 off of the 'O' rings 142, moving the 'O' rings 150 to another desired groove and moving the tray downward such that the counterbore means 148 again engages the 'O' rings 150.

While the expandable ring means 142 and groove 150 have been shown as having an circular cross-section, the cross-sections could also be rectangular such that the expandable ring means is washer shaped and the groove 150 has an open rectangular cross-section. Other cross-sectional embodiments are also possible as long as the expandable ring means 150 engages the groove 142 and has parts protruding from the groove 142 which parts hold the expandable ring means 150 into the groove 142 and prevent disengagement of the expandable ring means from the groove 142. In addition, the ring means must withstand disengagement in the downward direction from loads on the tray which increase the downward pressure of the shoulder 152 on the ring means 150 to be used in the present invention.

While the adjustable positioning assembly is shown as used in the intermediate tray 14 it could also be used in any movable member wherein the adjustable positioning feature would be advantageous. Applications could include use in an adjustable hook for holding a cord, or use with a molded clamp member for holding a brush or the like without the scope of the present invention.

The compression means 46 of the present invention includes a threaded rod means 60. The threaded rod means 60 is internally placed in the axial opening 62 of the tubular structural member 44. The threaded rod means 60 also passes through holes 64 and 66 in the upper 42 and lower 22 support post engagement means and thereby defines a pair of threaded engaging ends 68 and 70. Nut means 72 and 74 are provided for operatively engaging the threaded rod means 60 and compressing the tubular support member 44 between the upper 42 and lower 22 support post engagement means.

In a preferred embodiment of the invention, the tubular support member includes a length of PVC tubing which is readily available as an off-the-shelf item in hardware stores and the like. In addition, other plastic materials could be used for the tubular support member of the present invention provided that the material has the requisite structural integrity and is impervious to cleaning chemicals and other solutions used by cleaning personnel.

The threaded rod means in the preferred embodiment of the present invention is of the type readily available at any hardware store. The threaded rod may be threaded along its entire length or in the alternative may as effectively only have threaded ends without departing rom the present invention. While the preferred embodiment of the present invention uses steel rod, any other material which is structurally suitable could be used without departing from the present invention. In addition, the threaded rod means can be readily obtained in various lengths from any of a number of sources. Therefore, the present invention provides a customizable vertical height, accomplished by either cutting or obtaining shorter or longer lengths of PVC tubings and corresponding shorter or longer lengths of threaded rods.

The utensil holding means 36 of the present invention includes a plurality 76 of molded clips which are integrally molded with the top tray means 16. As shown in FIG. 4, each of the clips 36 includes a pair of resilient clamping arms 78 and 80. The clamping arms have a generally arcuate shape and define a narrow entry hole 82. In addition, the base means 12 of the present invention has a utensil handle retaining slot 82 located on the utility tray portion 20. In operation, the utensil holding means 36 operates in the following manner. A terminal end of a mop handle 84 is placed in the narrow entry hole retaining slot 82. The handle 84 engages the handle securing portion 86 by inward pressure against the resilient clamping arms 78 and 80 which cause arms 78 and 80 to move outward thereby opening the narrow entry hole 82. This allows the handle to move inward and thereby holds the handle in the handle securing portion 86 by inward pressure due to the resilient clamping arms 78 and 80.

The front wall 122 of the present invention also includes mop handle engaging clips, generally shown at 130, which hold a mop handle while the mop head is in the mop bucket for securely transporting the mop and mop bucket on the utility cart.

When a mop is resting in a mop bucket which is in place on the utility cart, the mop handle will be at an angle as it leans against wall 122 of top tray 16. To facilitate securing of the mop handle, the mop handle engaging clips of the present invention are modified to securely hold a tilted mop handle. More specifically, as illustrated on FIG. 6, the mop handle engaging clips 130 of the present invention include modified handle engaging surfaces 132, 132' and 134, 134' which are generally frusto-conical surfaces which abut to one another at ridge 136. The frusto-conical surfaces 132, 134 are skewed such that the back surfaces 132, 134 are at a greater angle from the vertical than frontal surfaces 132', 134'.

The configuration of mop handle engaging clips 130 is advantageous in providing secure engagement of a mop handle at a variety of angles. A mop handle protruding from a mop bucket may exit the mop bucket at an infinite variety of angles due to the variable positioning of the mop head in the mop bucket. Thus as shown in FIG. 6, the modified mop handle engagement clamps will facilitate the secure engagement of a mop handle because of engagement of the mop handle over a relatively large circumferential surface area even when the mop handle is at an angle to the clip. Thus, as shown in FIG. 6, mop handle positions 138 and 140 are shown to better illustrate engagement of a mop handle by the modified mop handle engagement clips. As an illustration, a mop handle in the position of 138, wherein the mop handle is leaning forward the top tray 16, is in aligned engagement with surface 132 of the clip 130 and moving circumferentially toward surface 132', the mop handle is engaged by ridge 136 and then by the lower portion of surface 134', thus providing for secured engagement of the mop handle.

As shown in the alternative, when the mop handle is angled away from the tray 16 as in position 140, the mop handle would be circumferentially engaged by aligned engagement with surface 132', and engagement with ridge 136. These examples are given as illustrations, the modified mop handle engagement clips of the present invention will securely hold a mop handle at a variety of angles, including those shown.

In a preferred embodiment of the invention four modified mop handle engagement clips are provided, preferably with two generally positioned at the center of the wall 122. In addition, the clips are integrally molded with wall 122 in a preferred embodiment of the invention.

In addition, vacuum wand extensions may be held in the utility cart of the present invention by molded clips 90 on the side opposed to the utensil handle molded clips and having the intermediate tray portion 14 which included molded vacuum wand extension holders 88. A vacuum wand extension is placed over holder 88 and then is placed into a corresponding molded clip 90 on the top tray means 16.

An adjustable hook means 92 is provided in the present invention for convenient placement on one or several of the tubular structural members of the present invention. The adjustable hook means 92 includes a hook portion 93, a body portion 94, and a clamping portion 95. The hook 93 abd body 94 portions may be a single integrally molded assembly or in the alternative, the hook portion may be attached separately to facilitate the use of interchangeable hook configurations. For instance, a hook configuration which is swiveable may be used in the present invention. The clamping portion of the present invention is operatively attached to the body portion and is of the same clamping means configuration illustrated in FIG. 2 and includes an arcuate strap 56 and a pair of companion bolted flanges 58. In the alternative the hook could include an adjustable positioning assembly as shown in FIGS. 8 and 9 and disclosed above.

In the configuration shown in FIG. 1, four of the adjustable hook means 92 are clamped on the front tubular support members which would facilitate the winding of an extension cord around the four hook members 92. However, as will be readily appreciated by those skilled in the art, the adjustable hook means may be placed on any of the tubular support members in many advantageous configurations and each adjustable hook means can be individually placed anywhere along the length of any of the tubular support members resulting in many customizable uses.

In the present invention, a novel rigid construction of a utility cart is provided in a utility cart having the features of the present invention. A utility cart which has a base member, a top tray member, and an intermediate tray is provided. A rigid construction of the utility cart having these features comprises the following elements. A plurality of tubular support members 44 are provided which are held in compression between the base member 12 and the upper tray member 16 by threaded rod 60 and nut arrangement 68 and 70. In this configuration, the threaded rod passes through the upper tray member 16 and the base member 12 and through the center of the tubular support member 44. The nut arrangement 68 and 70 screwably places compression on the tubular support members 44 by engaging a bottom side 96 of the base member 12 and a top side 98 of the upper tray member 16, thereby operating to clamp the tubular support member 44 between base member 12 and the upper tray member 16.

In a preferred embodiment of the present invention, the plurality of tubular support members is further defined as being four lengths of PVC tubing which are disposed at the corners of the utility tray portion 20 of the base member and the corners of the upper tray member 16.

In a preferred embodiment of the invention, the base member 12 is provided which includes a mop bucket securing portion 24 with vertical walls 100, 102, 104 and 106, which define a first box-like portion. The mop bucket securing portion 24 includes caster curbs 26 for securing a mop bucket in non-moving engagement while the mop bucket is being transported on the utility cart. As will be appreciated by one skilled in the art, the use of a mop bucket having casters on the bottom is common. The caster curbs 26 are situated as to provide secure means for stopping movement of a castered mop bucket and extends to provide a level surface 29 for a mop bucket without casters. Thus, the present invention provides a simple means for transporting a mop bucket with limited spilling of the bucket and without being encumbered by the necessity of the cleaning person having to pull the mop bucket behind him or her or carrying the mop bucket separately.

The draining surface 28 is provided on the mop bucket securing drain portion 24 for easy draining of any water which has been spilled from the mop bucket. Included in the draining surface is a drain and drain plug arrangement 30 for selectively retaining or emptying the water in the draining surface 28. The base member 12 also has a molded bumper 108 around the periphery of the base member 12 and provides for protection of furniture and other things which may be damaged by careless operation of the utility cart and further operates to protect the utility cart from undue damage.

The base means 12 also includes a lower utility tray portion 20 which is adjacent to and sharing a vertical wall 106 with the mop bucket portion 24. The utility tray portion 20 has vertical walls 106, 110, 112 and 114 which define a second box-like portion. The lower support member engagement means is located at each of the corners of the box-like portion of the lower utility tray portion 20. A terminal utensil handle retention portion 82 is also provided and has a second vertical wall 116 which is parallel to vertical side wall 114 and defines an open slot for engaging the terminal end of a utensil handle.

The top tray member 16 has vertical walls 118, 120, 122 and 123 which define a box-like upper tray portion. The top member also includes upper support member engagement means 42 located at the corners of the box-like portion. A plurality of molded utensil clips 36 which are integrally formed within opposite side walls 120 and 124 of the top tray member 16 is provided. A plurality of modified mop handle engaging clips 130 which have a generally bent hour-glass cross-sectional shape formed of skewed opposing frusto-conical surfaces 132, 134, are provided for securely holding a mop handle which is disposed at an angle out of the mop bucket. Also included is a handle means 38 which defines a central opening 40 for placement of a trash bag in a bag open arrangement. Also included on the handle member are hooks 39 extending from the bottom of handle 38. The hooks are positioned to hang a sign from such as a "Caution, Wet Floor" sign generally used while the operator is mopping a floor.

Four tubular support members 32 preferably consisting of PVC tubing are provided which are compressibly engaged between the lower support member engagement portion 22 and the upper support member engagement portion 42 by compression rod 60 with threaded ends 68 and 70 which pass through the upper and lower 42, 22 support member engagement portions and engage the upper and lower support member engagement portions with a pair of end nuts 72 and 74. The releasable arcuate clamps include arcuate clamping strap 56 having a pair of companion bolted flanges 58 which are operatively attached to the intermediate tray 14 for tensioning the arcuate clamping strap 56 radially inwardly, which in turn clamps the tubular support member between the arcuate clamping strap 56 and the intermediate tray 52. The base means 12 also includes a pair of multidirectional front casters 122 and a pair of axially mounted rear wheels 124 for support and movement of the utility cart. The base means also includes rear wheel fenders 126 located at the side of the utility tray portion 20 which protect spray from the rear wheels 124. In addition, the intermediate tray includes a handle 128 attached to the side of the intermediate tray 14 which may be used in steering the utility cart.

In the alternative the intermediate tray may include a series of throughbores 146 having corresponding counterbores 148 which define shoulders 152, situated at the corners thereof. The support members 44 ahve a plurality of circumferential grooves 142 in which expandable ring member 150 are placed. The expandable ring members 150 are inserted in horizontally planar groove 142 of the four support members 44, with the tray 52 held vertically above the ring members. The tray is then lowered onto the rings with the respective counterbores engaging the outer periphery of the expandable ring member 150 and the shoulder 152 being retained from further downward movement by supporting engagement with the expandable ring members 150.

Also provided is at least one adjustably mounted hook member 92 which includes the same arcuate clamping arrangment disclosed above (FIG. 2). In the alternative the adjustable hook member could include the throughbore and counterbore assembly for adjustable positioning used in combination with the expandable ring as disclosed above (FIG. 8). Any number of these members can be used and positioned on any of the tubular support members of the present invention as required by the final user.

The utility cart of the present invention provides a lightweight efficient cart which is substantially made of lightweight plastic material in its preferred embodiment which is impervious to water and caustic chemicals used in the cleaning process. In addition, the major structural components are readily available PVC tubing and threaded rod providing for easy construction and versatility in the utility cart.

The invention has been described in an illustrative manner and it is to be understood that the terminology which has been used is intended to be that of description rather than of limitation.

Obviously, many modifications and variations of the present invention are possible in light of the above teachings. It is therefore to be understood that within the scope of the appended claims, the invention may be practiced otherwise than as specifically described.

What is claimed is:

1. A manually propelled utility cart comprising:
   a base means, an intermediate tray means, and a top tray means including wheeled movement means for multidirectional horizontal movement of said utility cart along a floor surface;
   vertical structural support means for supporting said intermediate tray means and said top tray means vertically upward from said base means, and said intermediate tray means having adjustable positioning means and being in slideable engagement with said vertical structural support means, said adjustable positioning means includes an expandable ring means;
   said vertical structural support means including at least one hollow rod structural member engaged and secured in compression between said base means and said top tray means by a compression means;
   said structural support member further comprises a vertical support member having a continuous peripheral groove therein;
   said adjustable positioning means further includes a throughbore means in said intermediate tray means for defining a throughbore corresponding to said vertical support member for close sliding engagement with said vertical support member, and a counterbore means in said intermediate tray means defining a counterbore in a lower portion of said intermediate tray means, said counterbore means being in alignment with said throughbore means and defining a shoulder portion;
   said expandable ring means positioned in said groove, said counterbore means securely engaging an outermost portion of said expandable ring means, wherein said intermediate tray is held in position on said support member by said counterbore means engaging and retaining said expandable ring means in said groove, and said shoulder portion of said tray being held in resting engagement with said expandable ring means to prevent downward movement of said tray beyond a predetermined position.

2. The manually propelled utility cart of claim 1 wherein said vertical support member further includes a plurality of said grooves along the vertical length of said structural support member.

3. The manually propelled utility cart of claim 2 wherein said vertical support member further comprises a member having a cylindrical cross-section.

4. the manually propelled utility cart of claim 2 wherein said vertical support member is a length of PVC tubing.

5. The manually propelled utility cart of claim 1 wherein said base means includes a utility tray means.

6. The manually propelled utility cart of claim 1 wherein said base means includes lower support post engaging means and said top tray means includes upper support post engaging means;
   said hollow rod structural member being held and secured in compression between said lower support post engagement means and said upper support post engagement means by said compression means.

7. The manually propelled utility cart of claim 1 wherein said top tray means includes utensil holding means.

8. The manually propelled utility cart of claim 7 wherein said utensil holding means further includes a plurality of clips integrally molded with said top tray means and each of said clips having a pair of resilient clamping arms and a handle securing portion.

9. The manually propelled utility cart of claim 8 wherein said utensil holding means further includes modified mop handle engagement means attached to a wall of said top tray means facing said mop bucket carrying means.

said modified mop handle engaging means having a pair of resilient clamping arms and a mop handle engaging surface means for engaging a mop handle disposed at an angle.

10. The manually propelled utility cart of claim 9 wherein said mop handle engaging surface means further includes a frusto-conical surface for engaging a mop handle disposed at an angle.

11. The manually propelled utility cart of claim 9 wherein said mop handle engaging surface further includes a skewed frusto-conical surface such that the surface portion closest to said top tray is at a greater angle to the verticcal than an outermost surface, of said resilient clamping arms away from said top tray.

12. The manually propelled utility cart of claim 9 wherein said mop handle engaging surface further includes a pair of opposing and skewed frusto-conical surfaces forming a bent-hourglass cross-sectional shape having a ridge substantially at the center of said bent hourglass cross sectional shape.

13. The manually propelled utility cart of claim 1 further including adjustable hook means for placement on said tubular structural member in sliding clampable engagement with said tubular structural member.

14. The manually propelled utility cart of claim 13 wherein said adjustable hook means includes a hook portion, a body portion and a clamping portion including an arcuate strap having a pair of bolted flanges for clamping said vertically adjustable hook means in variable vertical positions along said tubular structural member.

15. The manually propelled utility cart of claim 13 wherein said hook portion and body portion are integrally molded.

16. The manually propelled utility cart of claim 13 wherein said hook portion is swivably mounted on said body portion.

17. The manually propelled utility cart of claim 1 wherein said top tray means includes a handle having an integral trash bag retention means.

18. A manually propelled utility cart comprising:
a base including a mop bucket securing portion having vertical wall members defining a first box portion, caster curbs for securing a castered mop bucket in non-moving engagement, a draining surface and a centrally disposed removably plugged drain for draining said box-like portion, an integrally molded bumper situated around the periphery of said base means for protection of furniture and utility cart from damage;
said base including a lower utility tray portion adjacent and sharing a vertical wall with said mop bucket portion and said utility tray portion having vertical walls defining a second box-like portion, and lower support member engagement means at each of the corners of said box-like portion of said lower utility tray portion, a terminal utensil handle retention portion having a second vertical wall parallel to a vertical side wall and defining an open slot for engaging the terminal end of a utensil handle;
a top tray including a top tray portion having upper support member engagement portions and vertical walls defining a box-like upper tray, a plurality of molded utensil clips integrally formed within opposite side walls of said top tray portion, a handle means defining a central opening for placement of a trash bag in a bag opened arrangement, a plurality of modified mop handle engaging clips having a bent hour-glass engaging shape formed of opposing frusto-conical surfaces;
a plurality of PVC tubing support members compressibly engaged between said lower support member engagement portions and said upper support member engagement portions by a compression rod with threaded ends passing through said upper and lower support member engagement portions and engaging said upper and lower support member engagement portions with a pair of end nuts, said support members further comprise a vertical support member having a continuous peripheral groove therein;
an intermediate tray, in slideable engagement with said PVC tubing support means and including an adjustable positioning assembly for adjustable positioning said intermediate tray along said support members and further including vertical walls defining an intermediate tray, said adjustable positioning means includes an expandable ring means, said intermediate tray including vacuum wand extension holders integrally formed therein for engagement into an open end of a vacuum wand extension, said vacuum wand extension holders extending upward from said intermediate tray and having a cross-like cross section;
said adjustable positioning means further includes a throughbore means in said intermediate tray means for defining a throughbore corresponding to said support members for close sliding engagement with said support members, and a counterbore means in said intermediate tray means defining a counterbore in a lower portion of said intermediate tray means, said counterbore means being in alignment with said throughbore means and defining a shoulder portion;
said expandable ring means positioned in said groove, said counterbore means securely engaging an outermost portion of said expandable ring means, wherein said intermediate tray is held in position on said support member by said counterbore means engaging and retaining said expandable ring means in said groove, and said shoulder portion of said tray being held in resting engagement with said expandable ring means to prevent downward movement of said tray beyond a predetermined position;
said base including a pair of multidirectional front casters and a pair of rear side wheels for support and movement of said utility cart;

said base including rear wheel fenders located at the side of said utility tray portion for protecting any spray from said rear wheels;

said intermediate tray also including a handle attached to a side of said intermediate tray for use in steering said utility cart, and at least one adjustable mounted hook member for positioning along the length of one of said PVC tubing support members.

19. The utility cart of claim 2 further comprising:

a movable member adjustably positionable along the height of said vertical support member;

said movable member having a second throughbore means defining a throughbore for close slidable engagment with said structural member, said movable member including a second counterbore means for defining a counterbore, said second counterbore means being aligned with said throughbore means and having a greater cross sectional width than said second throughbore means, said second throughbore means and said second counterbore means defining a second shoulder portion; and a second expandable ring means for positioning in one of said grooves, said second expandable ring means having a diameter for normally engaging a groove and having parts thereof protruding outward from said groove, wherein said second counterbore means is slidable over said parts of said second expandable ring means for retaining said second expandable ring means in said one groove by securely engaging the outermost periphery of said second expandable ring means and wherein said movable member is held in position by said second shoulder portion restingly engaging said second expandable ring means for preventing downward movement of said second shoulder portion beyond said second expandable ring means, said movable member being movable substantially without restraint in an upward direction for disengagement of said second expandable ring means which may be thereafter manually expanded for removal from said one of said grooves and repositioned in yet another of said peripheral continuous grooves.

20. The movable member of claim 19 wherein said movable member has a hook like portion attached thereto.

21. The movable member of claim 19 wherein said movable member is a utility handle clamping member.

* * * * *

UNITED STATES PATENT AND TRADEMARK OFFICE
CERTIFICATE OF CORRECTION

PATENT NO. : 4,923,202

DATED : May 8, 1990

INVENTOR(S) : Frank Breveglieri, Kenneth F. Streit

It is certified that error appears in the above-identified patent and that said Letters Patent is hereby corrected as shown below:

Title page:

Abstract, Line 25, "A" should be --An--;

Col. 2, Line 50, "furthr" should be --further--;

Col. 3, Line 22, "invnetion" should be --invention--;

Col. 4, Line 44, "the" should be --The--;

Col. 5, Line 30, "an" should be --a--;

Col. 6, Line 8, "rom" should be --from--;

Col. 7, Line 4, "forward" should be --toward--;

Col. 7, Line 28, "included" should be --includes--;

Col. 7, Line 37, "abd" should be --and--;

UNITED STATES PATENT AND TRADEMARK OFFICE
CERTIFICATE OF CORRECTION

PATENT NO. : 4,923,202

DATED : May 8, 1990

INVENTOR(S) : Frank Breveglieri, Kenneth F. Streit

It is certified that error appears in the above-identified patent and that said Letters Patent is hereby corrected as shown below:

Col. 7, Line 41, "swiveable" should be --swivelable--

Col. 8, Line 29, "extends" should be --extend--;

Col. 9, Line 37, "ahve" should be --have--;

Col. 9, Line 39, "member" should be --members--;

Col. 10, Line 58, Claim 4, "the" should be --The--;

Col. 11, Line 16, Claim 9, "." should be --;--;

Col. 11, Line 29, Claim 11, "verticcal" should be --vertical--;

Col. 11, Line 52, Claim 16, "swivably" should be --swivelably--.

Signed and Sealed this

Twenty-ninth Day of October, 1991

Attest:

HARRY F. MANBECK, JR.

Attesting Officer

Commissioner of Patents and Trademarks